Oct. 13, 1936.  E. C. RICHARDSON  2,057,278
SPOT LAMP
Filed Aug. 31, 1935   3 Sheets-Sheet 1

INVENTOR.
Elmer C. Richardson
BY Lyon & Lyon
ATTORNEYS

Oct. 13, 1936.  E. C. RICHARDSON  2,057,278
SPOT LAMP
Filed Aug. 31, 1935  3 Sheets-Sheet 2

INVENTOR.
Elmer C. Richardson
BY Lyon & Lyon
ATTORNEYS

Oct. 13, 1936.  E. C. RICHARDSON  2,057,278
SPOT LAMP
Filed Aug. 31, 1935  3 Sheets-Sheet 3

INVENTOR.
Elmer C. Richardson
BY Lyon & Lyon
ATTORNEYS

Patented Oct. 13, 1936

2,057,278

UNITED STATES PATENT OFFICE 2,057,278

SPOT LAMP

Elmer C. Richardson, Los Angeles, Calif., assignor to Mole-Richardson, Inc., Los Angeles, Calif., a corporation of California Application August 31, 1935, Serial No. 38,750

3 Claims. (Cl. 240—44)

My invention relates to spot or flood lamps and has particular reference to lamps employed in the motion picture industry for spot illumination or flood light use in illuminating motion picture sets during the photographing of the pictures.

In the spot lighting or flood lighting of theatrical or motion picture stages, it is the common practice to employ a spot lamp or flood lamp comprising a suitable housing equipped with a lens behind which is mounted a relatively high powered incandescent lamp as a light source, the light from which is focused both by the lens on the front of the housing and by a suitable mirror disposed at the rear of the light source. In the manipulation of the flood or spot lamp it is necessary that the light source and mirror be rapidly adjusted with respect to the front of the housing to increase or decrease the divergence of the light from the flood lamp and control the intensity of the ilumination projected upon any selected portion of the stage or motion picture set.

It is also necessary that the lamp be so constructed as to permit ready access thereto to make adjustments in the focus relation between the reflector and the light source and to repair or replace the light source and when such flood lamps are employed, particularly on motion picture sets, the location of such lamps is usually such that only the rear of the lamp is accessible to the person making the adjustments or replacements.

It is, therefore, an object of my invention to provide a spot or flood lamp particularly adapted for stage and motion picture lighting effects in which a high intensity light source may be employed in addition with a mirror disposed at the rear of the light source, the mirror and light source being accessible through a door at the rear of the lamp housing.

Another object of my invention is to provide a means for conveniently changing the light source in a manner which permits the spherical mirror to be moved out of the way to allow access to the light source for such removal and replacement. This mirror mounting is provided with adjustments and stops which enables the mirror to be brought to its original position after a lamp has been removed and replaced and which thereby avoids the remaking of an optical adjustment necessary to the effective utilization of the source of light.

Since the weight and bulk of high-wattage spot lamps is such that good mechanical design demands that they be supported on trunnion bearings from each side of the lamp housing and for convenience are assembled to U-shaped yokes to permit elevation, depression and adjustment in a horizontal plane, my invention provides arrangements which permit all adjustments, removal and replacement of lamp globes and the manipulation of focus arrangements to be had from the rear of the lamp head, which is the part of the lamp most conveniently accessible in operation.

Other objects and advantages will be apparent from a study of the following specifications read in connection with the accompanying drawings, wherein Figure 1 is a vertical sectional view taken through a spot or flood lamp constructed in accordance with my invention;

Figures 1, 7:
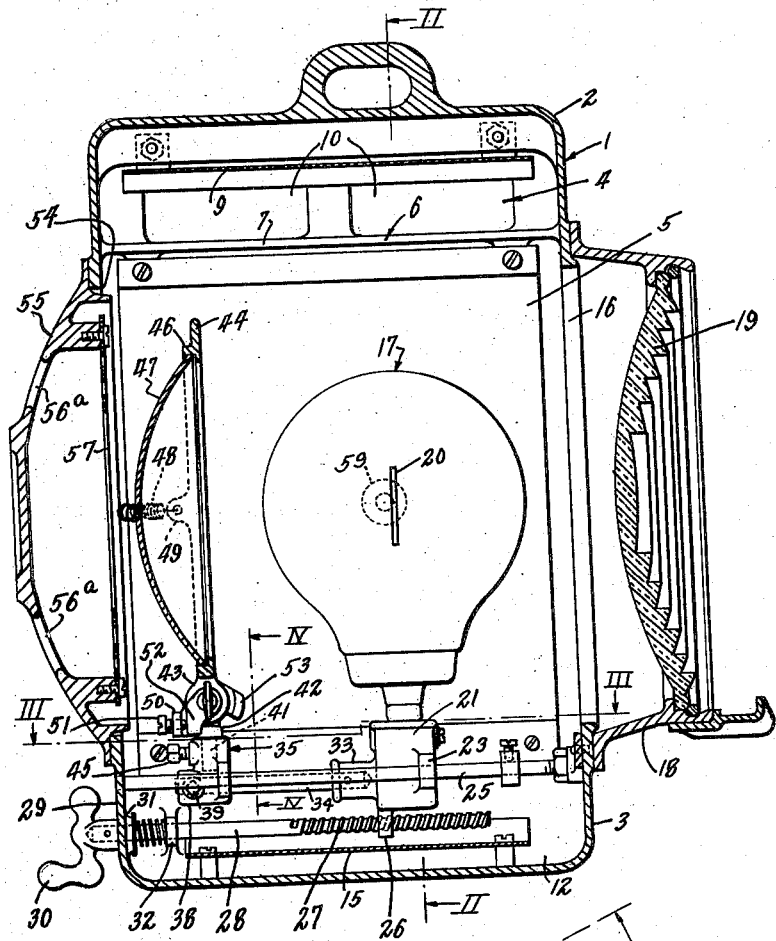
Figure 7 is a diagrammatic view illustrating the collection of light from the light source by the employment of the mirror and mirror mounting constituting my invention.

Referring to the drawings, I have illustrated my invention as incorporated in a spot or flood lamp employing a housing member 1, the same being preferably formed in a cylindrical or barrel shape having an upwardly projecting portion 2 extending along the length of the upper side of the cylinder or barrel while a similar downwardly projecting portion 3 is formed upon and extends along the length of the lower side of the cylinder or barrel.

The upper extension 2 provides a chamber 4 communicating with the interior 5 of the housing 1 through an opening 6 extending substantially the full length of the upper extension 2, the side walls of the housing 1 projecting inwardly as indicated at 7 and 8 arranged in overlapping vertical relation with a baffle plate 9 to prevent the direct transmission of illumination from the interior chamber 5 to the outside of the housing 1. The extension 2 is provided with a plurality of openings 10 and 11 permitting air to pass into and out of the interior 5 of the housing.

The lower extension 3 likewise forms a chamber 12 communicating with the exterior of the housing through suitable openings 13, the side walls of the housing 1 projecting inwardly of the extension 3 to form baffles indicated at 14 arranged in overlapping relation with the baffle plate 15 and preventing the direct passage of light from the interior of the housing to the exterior thereof while permitting free circulation of air through the openings 13 to the interior of the housing 1.

The front wall of the housing 1 is provided with a relatively large and preferably circular opening 16 through which light from a suitable light source 17 may pass, the opening 16 being preferably surrounded by an annular lens holder 18 in which is mounted a condensing lens 19. As will be described more fully hereinafter, the lens 19 is preferably of the echelon or Fresnel type selected so as to collect the greatest possible amount of illumination from the light source 17.

Figure 2:
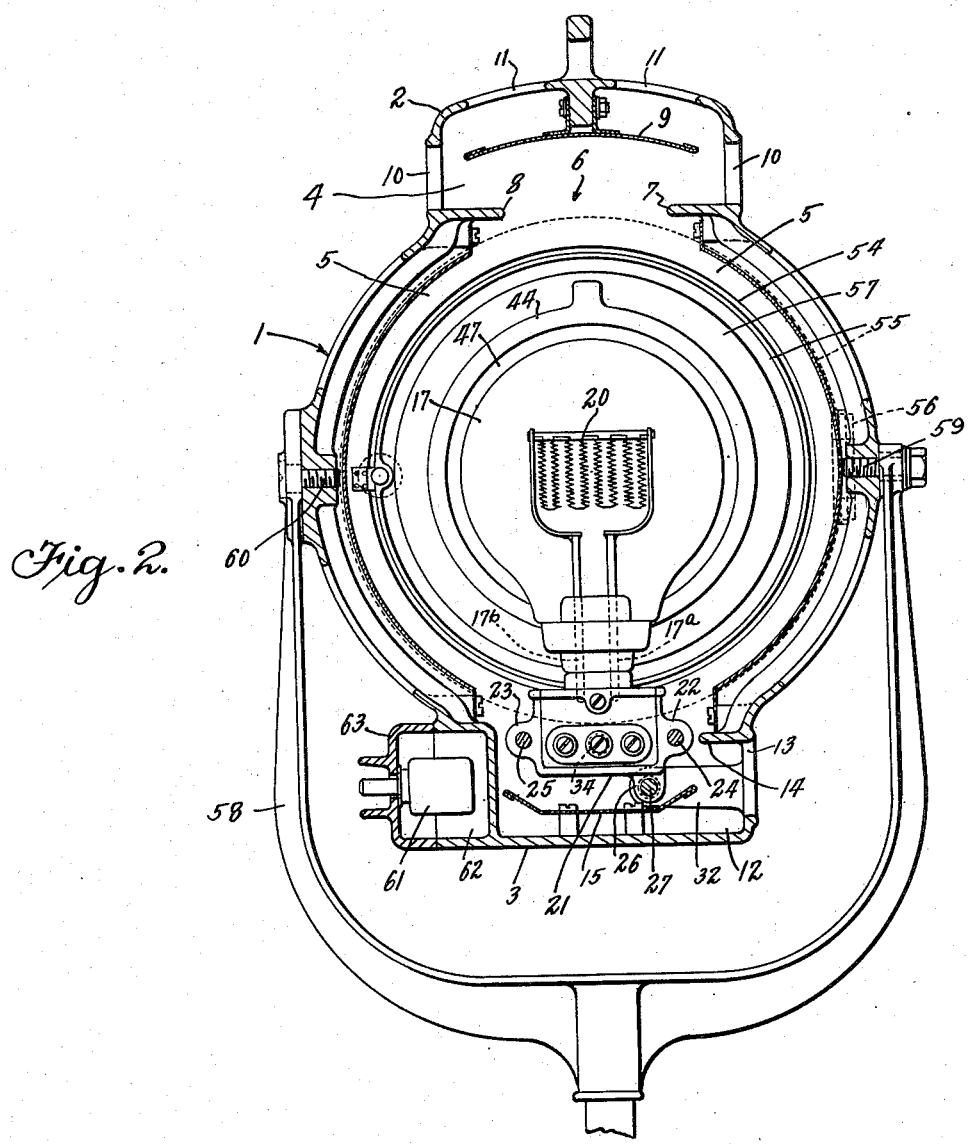
Figure 2 is a vertical sectional view taken through the lamp shown in Fig. 1 along the line II—II of Fig. 1.

The light source 17 is illustrated as being an incandescent lamp having its source of illumination constituted by a filament 20 preferably arranged in the form of a grid, as is illustrated particularly in Fig. 2. The light source 17 is mounted within the housing 1 upon a lamp support 21 constructed as a box-like member having a socket or receptacle into which the terminals 17a and 17b of the incandescent lamp may project for the purpose of holding the incandescent lamp in position and transmitting electric current to the filament thereof. The lamp support 21 is provided with a pair of laterally extending ears 22 and 23 forming sliding bearing members upon a pair of rods 24 and 25 secured to the housing 1 and extending longitudinally thereof.

The mounting of the lamp support 21 on the longitudinal rods 24 and 25 permits the lamp support 21 to be moved forwardly and rearwardly of the housing to any desired position, thus changing the distance between the light source and the lens 19. The light mounting 21 may be moved forwardly and rearwardly of the housing by any suitable means preferably comprising a threaded lug 26 extending downwardly from the lamp mounting 21 through which extends the threaded end 27 of the operating rod 28. The rod 28 extends through the rear face 29 of the housing and has attached thereto a suitable crank 30 by which the rod 28 may be rotated at the will of the operator of the lamp, the rod 28 being guided by bearing members 31 and 32 formed upon the housing 1 so as to cause the rod 28 to extend longitudinally of the housing 1 in substantial parallelism with the rods 24 and 25.

Immediately at the rear of the lamp mounting 21 is a rearwardly extending boss 33 to which is rigidly secured a rod or bar 34, the rod 34 extending rearwardly of the lamp mounting 21 and having secured at its rear end a mirror mounting bracket 35.

Figure 3:
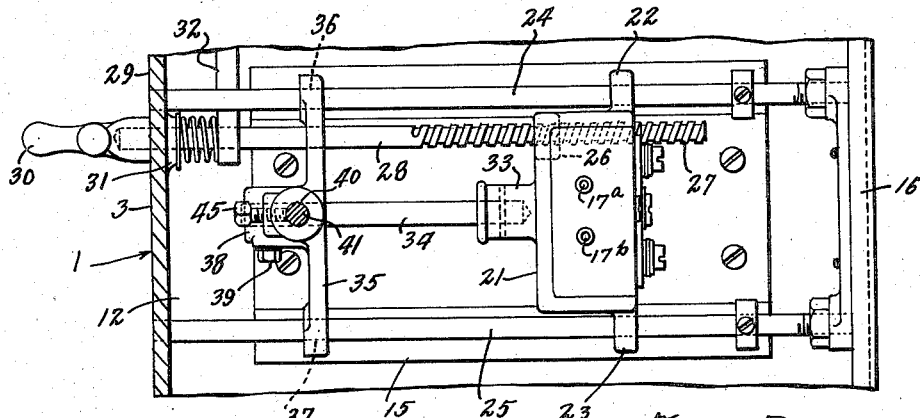
Figure 3 is a detail horizontal sectional view taken along line III—III of Fig. 1, illustrating the carriage employed for the light source and the mirror mounting.
Figure 4:
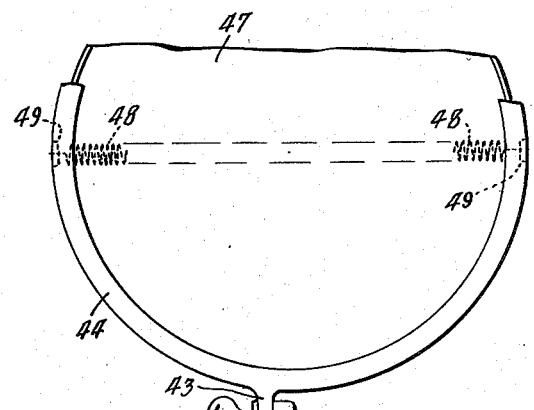
Figure 4 is a detail vertical elevational view of the mirror and mirror mounting employed in the practice of my invention.
Figure 5:
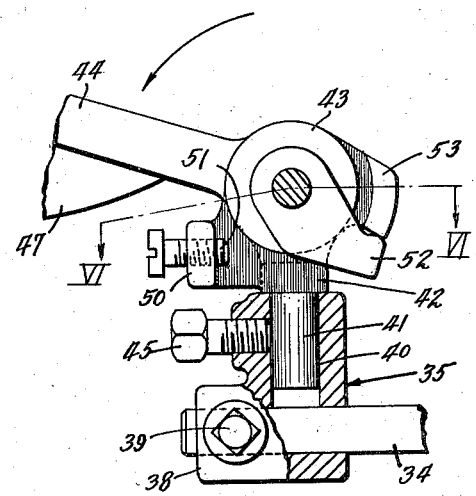
Figure 5 is a detail side elevational view, partly in section, of the mirror mounting and adjusting devices employed in the practice of my invention.
Figure 6:
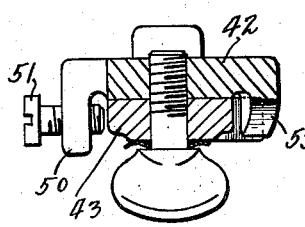
Figure 6 is a horizontal sectional view, taken along line VI—VI of Fig. 5.

By referring particularly to Figs. 3, 4 and 5, it will be observed that the mirror mounting bracket 35 comprises a T-shaped member, the outer ends of the T having openings 36 and 37 for slidably engaging the rods 24 and 25 but holding the mirror bracket in parallel relation to the lamp mounting 21. The mirror mounting bracket 35 is provided with a rearwardly extending boss 38 through which extends the rear end of the rod 34, the bracket 35 being secured to the rod 34 by means of a movable set screw 39 so that by properly adjusting the bracket 35 forwardly and rearwardly relative to the lamp mounting 21, and then tightening the set screw 39 the bracket 35 will always remain at a fixed distance rearwardly of the lamp mounting 21.

The central lug of the T-shaped bracket 35 extends upwardly and has a vertical bore 40 therein to receive a pin 41 projecting downwardly from one member 42 of a mirror hinge, the opposite member of which is indicated at 43 as being rigidly secured or formed integrally with an annular mirror frame 44. It will also be observed that a set screw 45 projects into the bore 40 and may be tightened into gripping relation with a pin 41 to maintain the pin at any desired height relative to the bracket 35 and fixed against rotation within the bore 40.

The mirror frame 44 is preferably formed with a rearwardly extending flange 46 defining an annulus against which the edge of a spherical mirror 47 may seat, the mirror being held in the seating relation thereon by means of a tension spring 48 extending between a pair of lugs 49 formed upon and extending from the flange 46.

As will be observed from an inspection of Figs. 1, 3, 4 and 5, the mirror 47 when mounted in the frame 44 may be adjusted toward and away from the incandescent lamp or other light source 20 until the light source is properly focused by the mirror 47 and the set screws 39 and 45 may be tightened to hold this fixed relation. However, the hinge mounting 42, 43, by which the mirror 47 is secured upon the mirror mounting bracket 45, permits the mirror 47 and its frame 44 to be swung rearwardly from the lamp or light source 20 to permit access to the light source 20 from the rear of the housing 1, while when the mirror 47 is swung back to its vertical position it will be again in the fixed focused relation at which the adjustment was initially made. To insure movement of the mirror 47 back to its original adjusted position, I prefer to provide a lug 50 extending rearwardly and laterally from the hinge member 42 into which is threaded an adjusting screw 51 bearing upon a downwardly extending finger 52 formed upon the hinge member 43 so that by properly adjusting the screw 51 the same will form a fixed stop against which the finger or stop member 52 on the mirror frame will abut, making it only necessary for the operator of the lamp to press the mirror 47 toward its vertical position until it is stopped by the screw 51.

In order to prevent injury to the mirror 47 when it is swung downwardly, I prefer to provide a forwardly and laterally extending lug 53 adapted to engage the finger 52 as shown in Fig. 5 when the mirror is drawn rearwardly and downwardly from its vertical position.

By referring particularly to Figs. 1 and 2 it will be observed that the rear of the housing 1 is provided with a relatively large opening 54 adapted to be closed by a door 55 preferably hinged as indicated at 56 (see Fig. 2) so that the door 55 may be swung from its normal closed position, as shown in Fig. 1, to an open position permitting access to the interior of the housing through the rear door. The door 55 is preferably provided with a plurality of ventilation openings 56a extending therethrough, there being a baffle 57 secured upon the door to prevent the direct transmission of light from the interior of the housing to the exterior thereof.

The entire housing may be mounted upon a suitable yoke or supporting bracket 58 by which the lamp may be readily turned horizontally to any desired position or may be swung about a horizontal axis defined by the trunnion bearings 59 and 60 in a vertical plane to direct the light from the lamp on any desired point.

Also, if desired, suitable switch mechanism 61 may be provided upon the lower extensions 3 of the housing 1, suitably enclosed in a chamber 62 formed in the side of the extension 3 and covered by a switch cover member 63 permitting the lamp to be switched on and off immediately at the lamp.

By referring particularly to Fig. 7, it will be observed that the mirror 47 is spaced rearwardly from the filament to such position as will bring the filament 20 substantially at the center of the sphere defined by the mirror 47 so that the entire light from the filament 20, both that emanating from the front of the filament and that emanating from the rear of the filament, is concentrated at the junction of the filament. With the lamp in the position shown in full lines in Fig. 7, the effective illumination projected through the lens 19 represents the illumination collected from both the front of the filament and the rear of the filament through an angle of approximately 74° while, when the light source and its mirror 47 are moved toward the lens 19, the effective angle of collection of the light from the front of the filament is increased, while the effective angle of collection of the light by the mirror is likewise increased the same amount, producing the result of a more brightly illuminated large area than is possible with the parabolic mirror arrangement heretofore used when a large area was to be illuminated. As will be understood by those skilled in the art, substantially all of the light emanating from a spot lamp or flood lamp employing a parabolic mirror emanates from the rear of the lamp filament, so that as the light source is drawn rearwardly from the focus, as is the case when the projected beam is flooded or diverged. The optical action of a parabolic mirror is such that a "ghost" or dark spot is formed on the center of the illuminated area. With my construction, employing a spherical mirror with the filament of a lamp placed substantially at the center thereof, substantially no shadow or image of the filament is projected and the illuminated area is of substantially constant intensity throughout. Again, the mirror 47 may be adjusted slightly to project an illuminated image of the separate coils of the filament 20 in the spaces between the adjacent coils of the filament, thereby producing in effect a relatively square area of illumination emanating from the plane of the filament 20 and further eliminating the objectionable shadow effects.

It will be observed that I have provided a spot lamp, or flood lamp, in which may be employed a suitable light source with a spherical mirror arranged at the rear of the light source and adjusted to any desired focusing relation relative to the source, and in which once this adjustment has been made the entire light source and mirror with their mounting devices may be moved forwardly and rearwardly of the lamp as a unit without changing the focused arrangement of the mirror and light source.

It will also be observed that by the employment of the door at the rear of the housing, access may be had to the mirror for making adjustments of the mirror to its proper focused position, while the lamp is burning, and while it is projecting light, permitting the illumination effects of the mirror adjustments to be observed while the adjustments are being made. Also, by mounting the mirror with its hinge mounting, the mirror may be swung out of the way of access through the rear door, to the light source, permitting changes or adjustments of the light source as may be desired, or, when incandescent lamps are used as light source, the entire lamp may be removed through the door without disturbing the lens attachment or any other portions of the lamp and its housing.

While I have shown and described the preferred embodiment of my invention, I do not wish to be limited to any of the details of construction shown herein, except as defined in the appended claims.

I claim:

1. In a flood or spot lamp, a housing having at one end thereof a lens through which light may be projected and having a door at the opposite end through which access to the interior of said housing may be obtained, a light source, means mounting said light source between said door and said lens for movement toward and away from said lens, a mirror, means mounting said mirror between said light source and said door with the light source in focus in said mirror, means connecting said mirror mounting means to said light source mounting means for movement therewith in fixed focus relation to said light source, said mirror mounting means including a hinge permitting said mirror to be swung out of the path of access to said light source through said door, and adjustable stop means on said hinge means for adjusting said mirror relative to said light source to focus the same, accessible through said door.

2. In a flood or spot lamp, a housing having a lens at one end thereof through which light may be projected, a door at the opposite end of said housing through which access to the interior of said housing may be obtained, a light source, a pair of rods within said housing and extending longitudinally thereof, mounting means for said light source slidably mounted upon said rods, a mirror mounting means for said mirror slidably mounted upon said rods between said light source and said door, means adjustably coupling said light source mounting means and said mirror mounting means together for movement as a unit along said rods, and means connected to said light source mounting means for moving said light source forwardly and rearwardly in said housing toward and away from said door, mirror mounting means including hinge means permitting said mirror to be swung out of the path of access to said light source through said door.

3. In a flood or spot lamp, a housing having a lens at one end thereof through which light may be projected, a door at the opposite end of said housing through which access to the interior of said housing may be obtained, a light source, a pair of rods within said housing and extending longitudinally thereof, mounting means for said light source slidably mounted upon said rods, a mirror mounting means for said mirror slidably mounted upon said rods between said light source and said door, means adjustably coupling said light source mounting means and said mirror mounting means together for movement as a unit along said rods, and means connected to said light source mounting means for moving said light source forwardly and rearwardly in said housing toward and away from said door, said mirror mounting means including hinge means interposed between said mirror and said rods whereby said mirror may be swung out through said door to permit access to said light source through said door.

ELMER C. RICHARDSON.